2,965,630
ETHYLENE POLYMERIZATION

Gaetano F. D'Alelio, South Bend, Ind., assignor to W. R. Grace & Co., New York, N.Y., a corporation of Connecticut No Drawing. Filed Apr. 23, 1959, Ser. No. 808,316

3 Claims. (Cl. 260—94.9)

This invention relates to an ethylene polymerization process incorporating an improved preformed catalyst.

In summary this invention is directed to synthesizing solid ethylene polymers by subjecting ethylene under pressure to the action of a preformed catalyst comprising the reaction products obtained by ball-milling Ti and $TiCl_4$ in an inert atmosphere.

It is known to prepare a catalyst for the polymerization of ethylene by ball milling all or part of the product obtained by heating Al powder and $TiCl_4$ at high temperature. This procedure is disclosed in French Patent 1,132,506 to Bayer (Examples 6 and 11). This same patent also discloses heating and distilling Ti sponge and $TiCl_4$ at 500° C. and using the reaction products thereof to polymerize ethylene (Example 3). In addition, this French patent in Example 13 discloses heating Ti sponge and $TiCl_4$ at 300° C. and using the reaction products to catalyze an ethylene polymerization. In all the above cases the titanium in the metal compounds forming the reaction products have a valency of less than 3.

It is also known to polymerize ethylene in the presence of a compound consisting of $TiCl_2$. See British Patent 778,639 to Du Pont (Example 3). However, using the well known formula for determining catalyst activity (grams of polymer/grams of catalyst reaction time (hr.)) it will be seen that this particular catalyst in Example 3 has an activity of $$\frac{1.5}{2.7 \times 1} = 0.56$$

It has now been discovered that preforming a catalyst comprising the reaction products obtained by ball-milling Ti and $TiCl_4$ in an inert atmosphere yields a catalyst of extremely high activity in polymerizing ethylene. No further preforming treatment of the catalyst such as heating, or heating and distilling the reaction products as set forth in the patent to Bayer supra is needed.

The catalyst so activated in accordance with the present invention has been found to be much more active in ethylene polymerization than one that has not been so prepared. The reason for the increased activity is not fully known. It appears however, that the freshly-fractured surfaces of the ground particles become extremely active sites for subsequent ethylene polymerization initiation if not allowed to come in contact with contaminants prior to or during the actual polymerization reaction. Such contaminants include moisture, oxygen, carbon dioxide, and the like. It also appears that the increased catalyst activity cannot be accounted for merely by an increase in the finer particles nor by an increase in the surface area, as I have found that after extended ball-milling periods, i.e. about 14 days, the surface area of the particles decreases. This decrease in surface area appears to be due to the agglomeration of smaller particles by electrostatic or Van der Waals forces. However, I do not wish to be bound by any theory in regard to the increased activity of my catalysts. Suffice it to say that preforming a Ti-$TiCl_4$ catalyst by grinding in the presence of an inert atmosphere yields a catalyst with greatly increased activity for ethylene polymerization.

As will be shown hereinafter, the composition of the reaction products vary with the duration of the grinding period. The exact reactions taking place are not fully known. However, it appears that the following reactions occur during the milling operation;

$$Ti + TiCl_4 \rightarrow 2TiCl_2 \qquad (1)$$

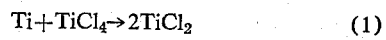

The dichloride then reacts with the tetrachloride to form trichloride:

$$TiCl_2 + TiCl_4 \rightarrow 2TiCl_3 \qquad (2)$$

In addition, disproportionation reactions occur during the milling, the extent of which are not fully understood. Step (1) supra appears to occur rapidly while Step (2) is slow as is shown in the data given in Table 1 wherein the formation of $TiCl_3$ in the solid phase of the catalyst is gradual.

To insure the enhanced catalytic activity of the Ti-$TiCl_4$ catalyst pretreated in conformance with this invention, it is necessary that the catalyst be maintained free from contact with contaminants which tend to deactivate the catalyst thereby decreasing or terminating its ethylene polymerization power. Such contaminants include oxygen, moisture, carbon dioxide, and the like. To preserve freedom from contaminants, the catalyst reactants and activated reaction products are transferred to and from the ball mill in a "dry box" maintained under a slight pressure of a gas inert to the activated catalyst. In the experiments and examples stated herein pure dry lamp-grade nitrogen is used as the gas to maintain an inert atmosphere in the "dry box," however, the noble gases, especially argon, helium, and neon are equally suitable. The transference of the thus activated catalyst in the "dry box" can be made either to a nitrogen purged storage vessel for later polymerization use or directly into the nitrogen purge polymerization reactor.

Although ball-milling was used in all examples in the specification, substantially any mechanism can be used for the grinding operation that can be maintained under slight pressure, free of catalyst contaminants, and which causes the individual pieces of the catalyst products to break up into smaller particles and/or causes their surfaces to be cleaned or abraded. Other operable mechanisms would include a rod mill, pebble mill, jet (or colloid) mill, vibrating ball mill and the like.

The duration of the grinding step is dependent upon the efficient of the grinding mechanism employed. In runs using a ball mill, the grinding should be carried on for periods of at least 1 day and preferably for several days, i.e. 10 to 25. However, more efficient grinding mechanisms, e.g. a vibrating ball mill would allow grinding time to be decreased substantially.

The grinding operation is preferably, but not necessarily, performed at slightly superatmospheric pressure under the inert gas, e.g. up to 100 p.s.i. of nitrogen. A preferred range of nitrogen pressure used in the grinding step is a superatmospheric pressure up to 25 p.s.i.

The Ti-$TiCl_4$ catalysts so prepared is useful in making high molecular weight solid polyethylene. It is operable at polymerization temperatures ranging from 110 to 225° C. and higher preferably, 125 to 175° C. Also, when using the catalyst of this invention, pressures in the polymerization reactor are suitable in the range of 250 to 2000 p.s.i., and for practical purposes, pressures in the range 350 to 1000 p.s.i. are adequate.

The polymerization reaction is generally, but not necessarily, carried out in an inert solvent. If an inert solvent is used, it should be one which is inert to the reaction, remains liquid under the polymerization conditions of temperature and pressure employed, and which is free of contaminants which retard or inhibit the polymerization reaction per se, or have an adverse effect on the catalyst's activity. Such contaminants include moisture, oxygen, carbon dioxide, any active hydrogen-containing material and the like. A preferred class of inert solvents are liquid hydrocarbon reaction mediums in which the ethylene monomer will dissolve, e.g. pentane, hexane, heptane, cycolhexane, octane, benzene, xylene, toluene, and the like.

The amount of activated preformed catalyst is not critical. Relatively small amounts are adequate to form relatively large amounts of polymer. In general, a practical range is 0.001 to 1 gram catalyst per gram of ethylene polymerized. Larger amounts of catalyst are operable but unnecessary.

The crude ethylene polymer obtaining by the practice of this invention may be purified and recovered by techniques well known in the art. For example, the crude polymer may be refluxed with alcoholic acids, e.g. HCl-methanol, followed by filtration and drying.

Throughout this specification it will be understood that all examples analyzed during the milling operation are maintained under conditions equivalent to the conditions of activation as regards freedom from deactivating contaminants.

The following examples will aid in illustrating the invention but do not limit the scope.

EXAMPLE 1

75 g. of Ti metal powder and 25 g. $TiCl_4$ were charged under an inert $N_2$ atmosphere to a stainless steel ball mill of 4-ounce capacity loaded to approximately one-half its bulk volume with ½-inch porcelain balls. The charge was ball-milled in an inert nitrogen atmosphere for 21 days. During the milling period, samples were taken from the mill to ascertain the composition of the reaction products at various intervals. The results of the sampling are shown in Table I.

*Table I*

| Days In Ball Mill | Weight percent | | | | |
|---|---|---|---|---|---|
| | Ti | $TiCl_2$ | $TiCl_3$ | $TiCl_4$ | Total |
| 0 | 75.0 | 0 | 0 | 25.0 | 100 |
| 5 | 78.3 | 10.1 | 1.6 | 10.0 | 100 |
| 10 | 76.8 | 15.3 | 2.7 | 5.2 | 100 |
| 19 | 76.4 | 16.0 | 5.6 | 2.0 | 100 |
| 21 | 75.7 | 15.2 | 7.4 | 1.7 | 100 |

EXAMPLE 2

Using the same apparatus and procedure as in Example 1 except that sampling was omitted, a charge of 10 g. Ti and 2 cc. $TiCl_4$ was added to the ball mill and milled under an inert $N_2$ atmosphere for 21 days. The reaction products were then transferred under a $N_2$ atmosphere to a 200 ml. stainless steel rocking autoclave equipped with gas inlet and containing 100 ml. heptane. The autoclave was sealed, heated to a temperature of about 125° C. and pressured with ethylene to 500 p.s.i. after which rocking was commenced. The pressure during the 22 minute run was maintained in the range 370–500 p.s.i. by repeated repressurizing with ethylene. At completion of the reaction, the autoclave was cooled and vented. The yield of crude solid polyethylene was 58.5 gms. The catalyst activity was equal to $$\frac{58.5}{13.5 \times 0.367} = 11.8$$

As can readily be seen, the catalyst activity, if due to the presence of $TiCl_2$ alone in Example 2, which according to Table I is equal to about 15% by weight of the catalyst reaction products used, would be:

$$\frac{58.5}{(13.5 \times 15\%)(0.367)} = 75$$

EXAMPLE 3

For $TiCl_2$ catalyst activity comparison, 1.18 g. of finely divided $TiCl_2$, which had not been subjected to ball-milling, was charged under a $N_2$ atmosphere to a 1-liter stainless steel autoclave equipped with stirrer and gas inlet containing 300 cc. of pure dry cyclohexane. Stirring was commenced and the autoclave heated to about 140° C. The autoclave was pressured to 450 p.s.i.g. with ethylene and maintained at a pressure in the range 375 to 450 p.s.i.g. throughout the 1 hour run. After cooling and venting, 3 g. of crude solid polyethylene was obtained. The catalyst activity was $$\frac{3}{1.18 \times 1} = 2.5$$

A comparison of activities in Examples 2 and 3 shows that preforming the catalyst in accordance with the instant invention gives a greatly increased activity if the activity is due to the presence of $TiCl_2$ alone.

EXAMPLE 4

Using the procedure and apparatus in Example 2, 1 g. Ti metal powder and 99 g. $TiCl_4$ were ball-milled under an inert $N_2$ atmosphere for 21 days. 10 g. of the thus activated preformed catalyst was transferred to an autoclave containing 100 ml. heptane wherein it was heated to about 125° C. and pressured with ethylene to 500 p.s.i. After 1 hour a good yield of crude solid polyethylene was obtained.

EXAMPLE 5

Following the procedure of the preceding example, 10 g. of a 100 g. charge consisting of 99 g. Ti and 1 g. $TiCl_4$, which had been ball-milled under $N_2$ for 21 days, was added to an autoclave containing 100 ml. heptane. After heating to 125° C. and pressured to 500 p.s.i. with ethylene the run was continued for 1 hour. Some crude solid polyethylene was obtained.

The ratio of Ti to $TiCl_4$ is not critical. Weight ratios of Ti:$TiCl_4$ of 1–100:100–1 are operative; a preferred range is respectively 1 to 10:1 to 100.

The uses of the polyethylene of this invention are analogous to those prepared by prior art procedures. The solid ethylene polymers can be used to make moldings, film, filament pipe, tubing and the like, using substantially the same equipment and technique customary for the solid polyethylene of the prior art.

I claim:

1. The method of forming an improved catalyst for ethylene polymerization which comprises grinding Ti metal and $TiCl_4$ in an inert atmosphere to form a catalyst consisting essentially of 75.7% Ti, 15.2% $TiCl_2$, 7.4% $TiCl_3$, and 1.7% $TiCl_4$ by weight.

2. The method of polymerizing ethylene that comprises subjecting ethylene under super atmospheric pressure to the action of a catalyst consisting essentially of 75.7% Ti, 15.2% $TiCl_2$, 7.4% $TiCl_3$, and 1.7% $TiCl_4$ by weight, prepared by grinding Ti metal and $TiCl_4$ in an inert atmosphere.

3. The process in accordance with claim 2 wherein the polymerization is performed in the presence of a liquid hydrocarbon reaction medium at a temperature in the range 110–225° C. and a pressure in the range 250–2000 p.s.i.

References Cited in the file of this patent

UNITED STATES PATENTS

| | | |
|---|---|---|
| 2,893,984 | Seelbock | July 7, 1959 |
| 2,899,416 | Schreyer | Aug. 11, 1959 |

FOREIGN PATENTS

| | | |
|---|---|---|
| 1,132,506 | France | Nov. 5, 1956 |